J. GALLEAZZI.
OCTAVE COUPLER FOR ACCORDIONS.
APPLICATION FILED SEPT. 13, 1911.
1,049,842.
Patented Jan. 7, 1913.
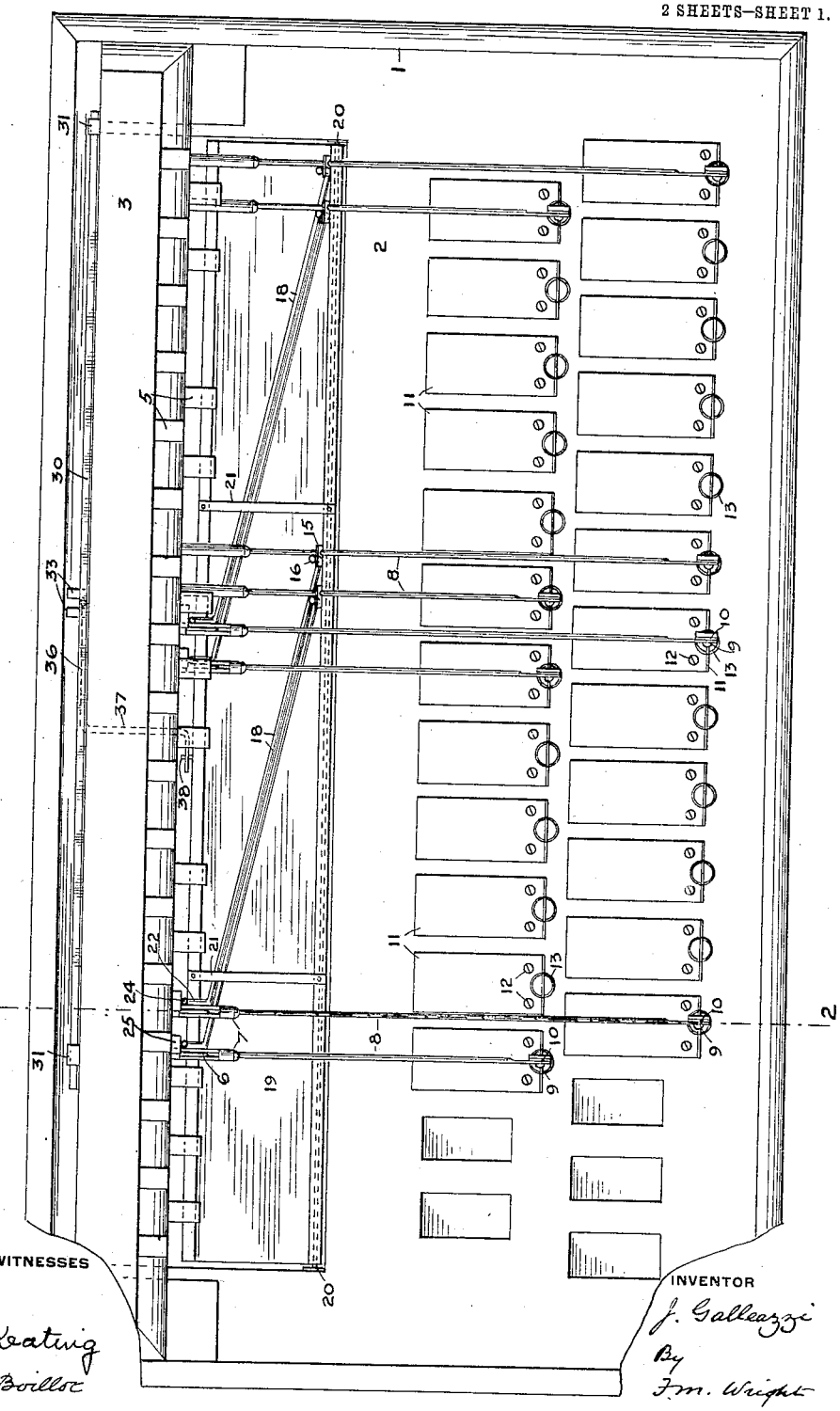

J. GALLEAZZI.
OCTAVE COUPLER FOR ACCORDIONS.
APPLICATION FILED SEPT. 13, 1911.
1,049,842.
Patented Jan. 7, 1913.
2 SHEETS—SHEET 2.
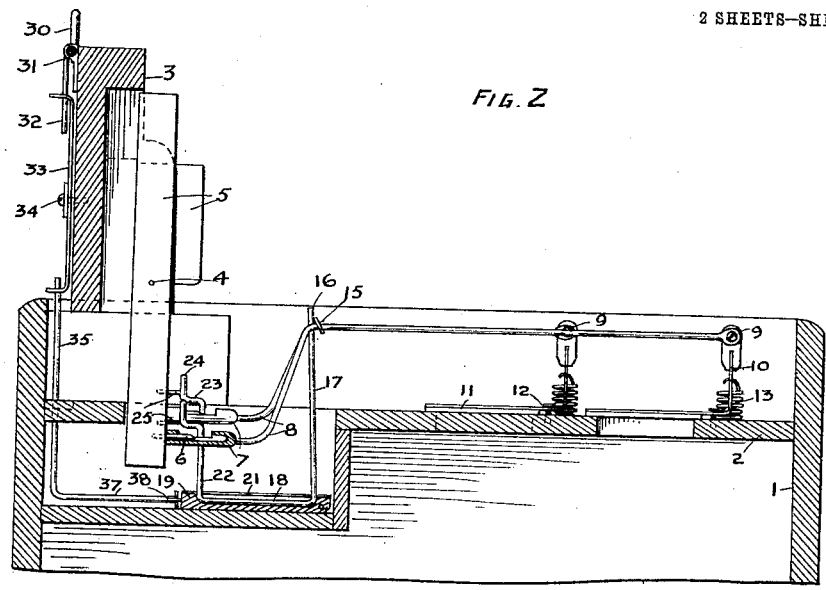
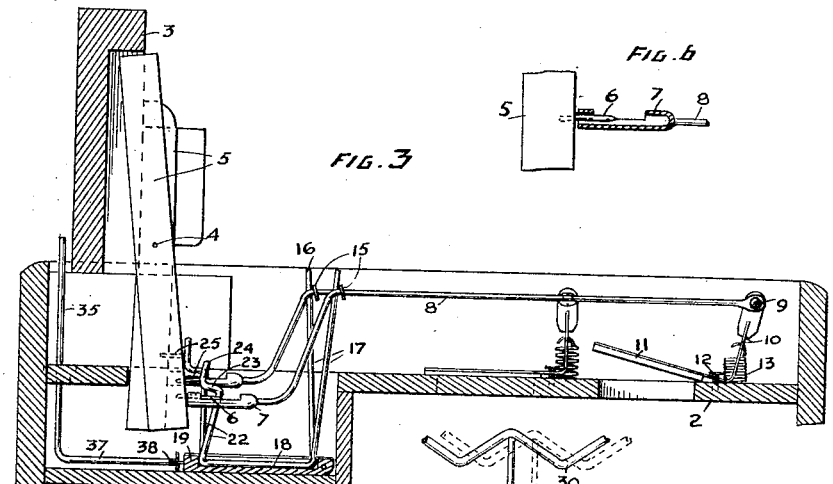
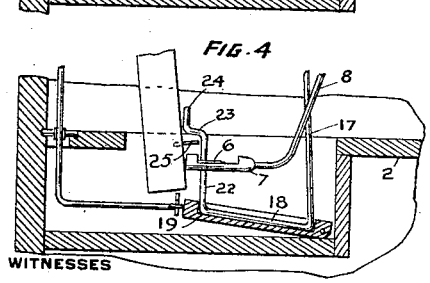
WITNESSES
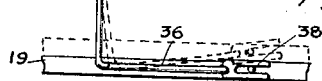
INVENTOR

UNITED STATES PATENT OFFICE.

JOSEPH GALLEAZZI, OF SAN FRANCISCO, CALIFORNIA.

OCTAVE-COUPLER FOR ACCORDIONS.

1,049,842.   Specification of Letters Patent.   Patented Jan. 7, 1913.

Application filed September 13, 1911. Serial No. 649,111.

*To all whom it may concern:*

Be it known that I, JOSEPH GALLEAZZI, a citizen of the United States, residing at San Francisco, in the county of San Francisco and State of California, have invented new and useful Improvements in Octave-Couplers for Accordions, of which the following is a specification.

The object of the present invention is to provide in a musical instrument which is played by finger keys, and especially in accordions, means for automatically producing, with each note, the octave thereof.

In the accompanying drawings, Figure 1 is a plan view, partly broken away, of a sounding board of an accordion embodying one form of my invention in its operative position; Fig. 2 is a sectional view on the line 2—2 of Fig. 1 also in an operative position; Fig. 3 is a similar view also in an operative position, certain of the parts being shown in positions different from that shown in Fig. 2; Fig. 4 is a broken view, similar to Fig. 3, showing the parts again in different positions; Fig. 5 is a detail front view of certain of the parts shown in Fig. 2; Fig. 6 is a sectional view of details.

Referring to the drawing, 1 indicates the casing of an accordion, having connected thereto a sounding board 2 and key board 3. Suitably pivoted, as shown at 4, on said key board are arranged key levers 5, from which extend pins 6 which enter sleeves 7 attached to the ends of actuator rods 8, which extend over the sounding board, and of which the other ends are pivoted, as shown at 9, to upward extensions 10 from valves 11 pivoted upon the sounding board, as shown at 12, and adapted to close openings in said sounding board adjacent to reeds, not shown. Springs 13 resting at one end on the sounding board engage said upward extensions 10 and normally depress said valves 11 on to said sounding board around said openings and close the same. Attached to said rods 8 near the sleeves 7 are lugs 15, against which can press the upper ends 16 of arms 17 extending upwardly from, and formed in one piece with, ends of rock shafts 18, which extend obliquely, as best shown in Fig. 1, and secured, as shown at 21, on a swinging channel-shaped shelf or table 19, extending longitudinally on the casing of the accordion, and pivoted in its ends, as shown at 20. The ends of said rock shaft abut against the sides of said channel shaped shelf. The other ends of said rock shafts also extend upwardly from said shelf to form arms 22, whose terminal portions are bent, as shown at 23, toward the lower portions of the key levers, and then upwardly, parallel with said lower portions, as shown at 24. From said lower portions toward said arms extend pushers 25. The rock shafts 18 are of such length that the arms at their opposite ends are respectively adapted, one to be actuated by a key lever for one note and the other to actuate the valve link for the octave of that note. When the shelf and rock shafts are in their lowermost position, as shown in Figs. 4 and 5, these pushers engage the extreme terminal portions 24, so that, when key levers are actuated, the corresponding pushers 25 press against the upper ends of arms 22, and rock the corresponding shafts, thereby causing the other arms 17 of said shafts to rock, so that their upper ends press against the lugs 15 and move the links which actuate the valves to produce the octaves of the notes produced by actuation of the original keys. Thus, with the movement of a key lever, not only the corresponding note is produced, but also its octave. When, however, the swinging shelf 19 is in its upper position, as shown in Fig. 4, the pushers 25 attached to the key levers no longer, when said key levers are actuated, engage corresponding arms 22, but said arms have been raised into such positions that said pushers pass beneath the bends 23 therein, and consequently there is no production of octaves by the actuation of a single key lever. To move the parts from the position in which there is such octave production to the position in which there is no such production, there is provided, adjacent to the edge of the key board, a slide 30, movable longitudinally in bearings 31, from which slide extends a pin 32 which actuates a lever 33, (see Fig. 5), pivoted, as shown at 34, upon the back of the key board, which lever actuates an arm 35 of a lever 36, another arm 37 of which is bent at right angles to pass beneath the inner ends of the key levers and into proximity with the free edge of the shelf or table, and is then bent again at right angles parallel with said free edge, and at its extreme end is forked to engage a pin 38 extending outwardly from said free edge. Thus, by moving said slide bar in one direction or the other, the rocking shelf 19 is raised or lowered, correspondingly moving the arms 22 out of or into operative relation with the pushers 25.

It will be observed that the arms 22 of the rock shafts are supported against longitudinal movement by the sleeves 7, and that these sleeves are themselves supported against longitudinal movement by being in engagement with the pins 6 in all positions of the key levers 5. The arms 17 at the other end of the rock shafts 18 are supported against longitudinal movement by the actuator rods 8. Thus no special bearings are needed for said rock shafts other than the narrow strips or cleats 21 which may be a considerable distance apart. I am thus enabled to provide a cheap and effective operative connection for coupling octaves within the small space permitted in an accordion.

I claim:—

1. The combination of a sounding board having openings for reeds, valves for controlling said openings, key levers for the respective valves, pins extending from said key levers, actuator rods operatively connected to said valves, lugs on said actuator rods, sleeves connected to said actuator rods into which said pins enter, rock shafts extending in a longitudinal direction of the sounding board, arms at the ends of each rock shaft, one of said arms abutting against one of said sleeves and located to be engaged and moved by the key lever when actuated, and the other arm abutting against one of said actuator rods and the lug thereon.

2. The combination of a sounding board having openings for reeds, valves for controlling said openings, key levers for the respective valves, actuator rods operatively connected to said valves, lugs on said actuator rods, each lever and the corresponding actuator rod being provided with coöperating parts preventing movement of the actuator rod in a transverse direction only, and rock shafts extending in a longitudinal direction of the sounding board, each formed with arms at its ends, one of said arms abutting against one of said coöperating parts and the other abutting against one of said actuator rods and the lug thereon.

3. The combination of a sounding board having openings for reeds, valves for controlling said openings, key levers for the respective valves, actuator rods operatively connected to said valves, lugs on said actuator rods, each lever and the corresponding actuator rod being provided with coöperating parts preventing movement of the actuator rod in a transverse direction only, rock shafts extending in a longitudinal direction of the sounding board, each formed with arms at its ends, one of said arms abutting against one of said coöperating parts and the other abutting against one of said actuator rods and the lug thereon, and a pivoted channel-shaped shelf for supporting all of said rock shafts, the ends of the rock shafts contacting with the sides of said channel.

In testimony whereof I have hereunto set my hand in the presence of two subscribing witnesses.

JOSEPH GALLEAZZI.

Witnesses:
F. M. WRIGHT,
D. B. RICHARDS.

Copies of this patent may be obtained for five cents each, by addressing the "Commissioner of Patents, Washington, D. C."